Patented Mar. 8, 1938

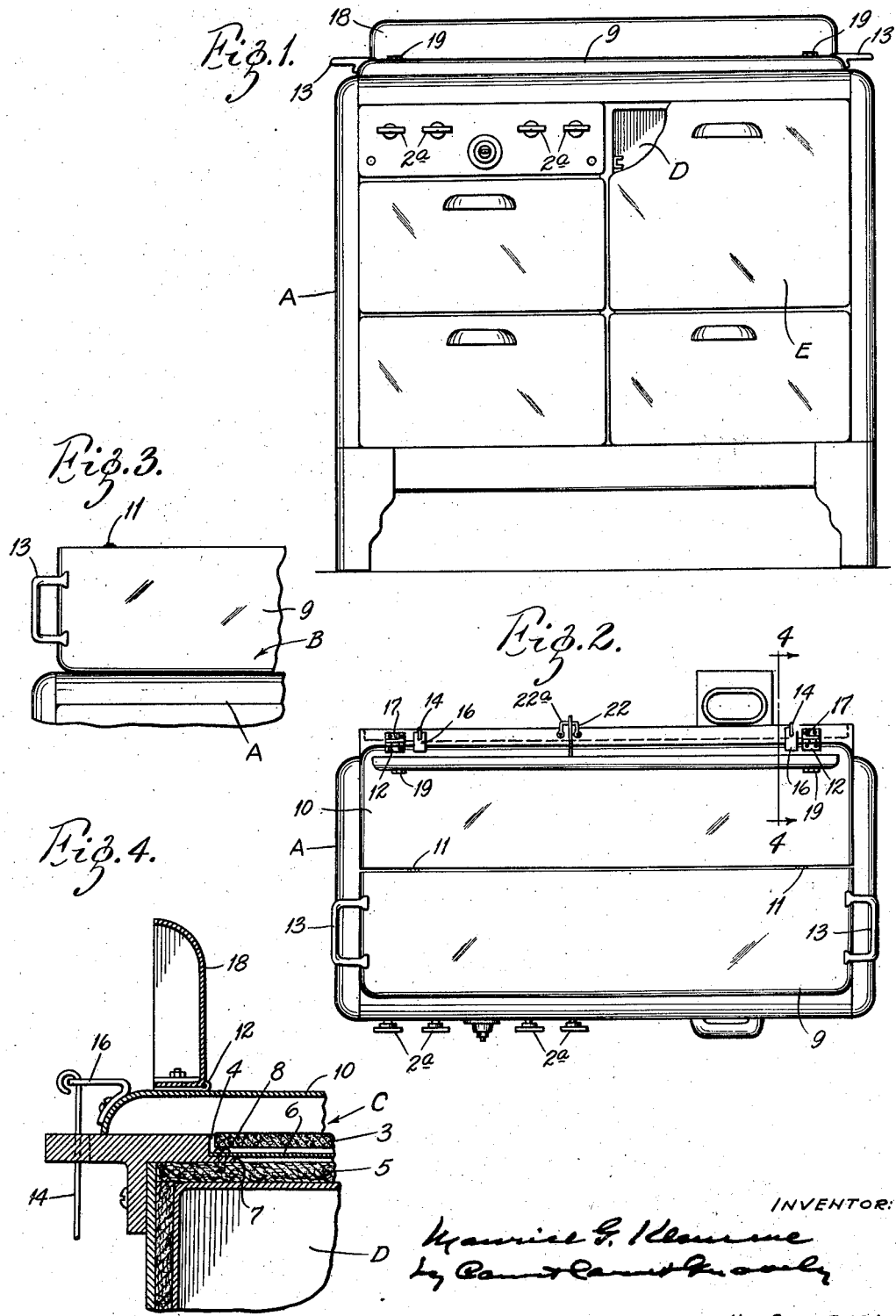

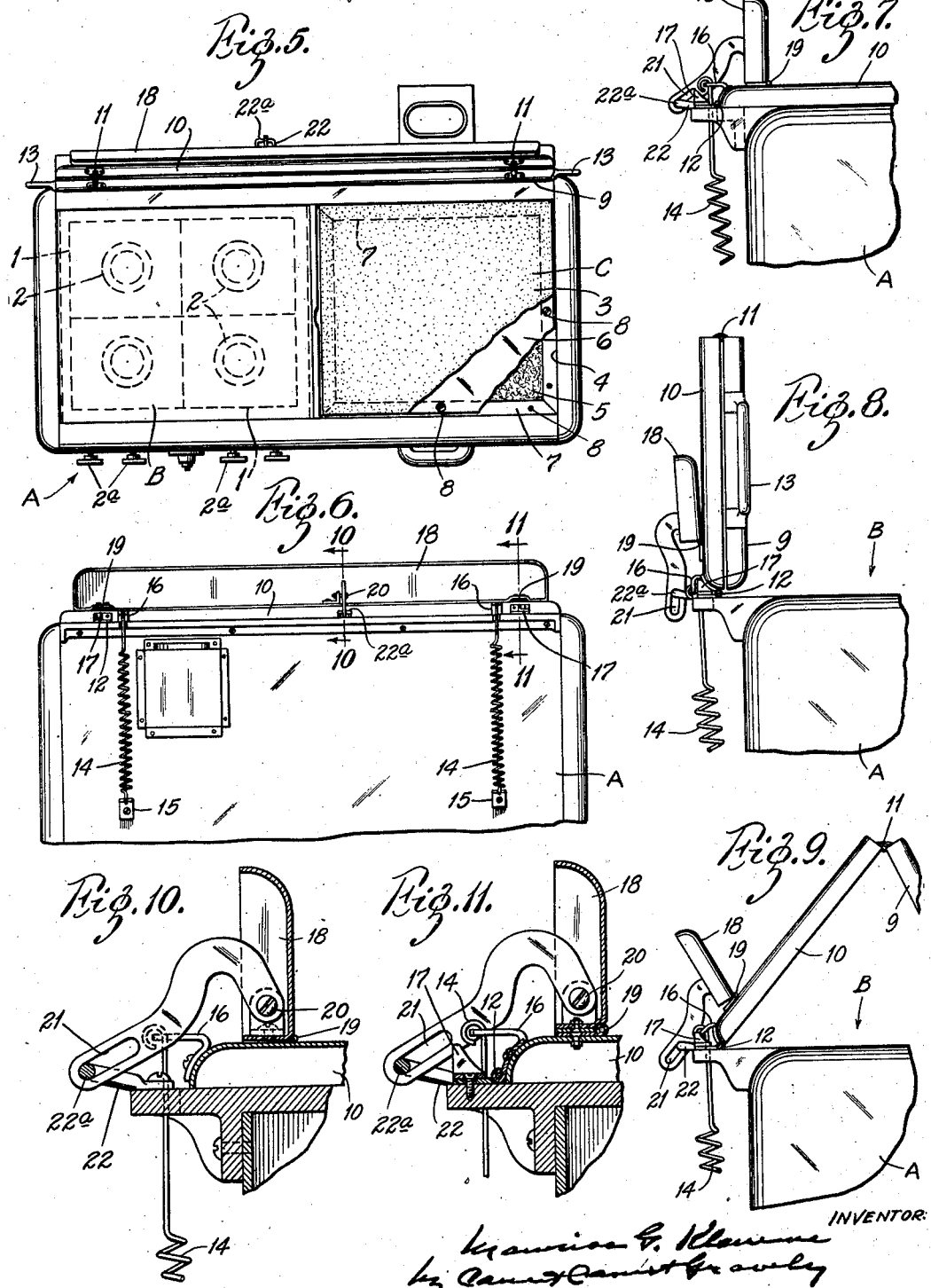

2,110,708

UNITED STATES PATENT OFFICE 2,110,708

COOKING STOVE

Maurice G. Klemme, Belleville, Ill., assignor to Eagle Foundry Company, Belleville, Ill., a corporation of Illinois Application February 5, 1936, Serial No. 62,412

6 Claims. (Cl. 126—214)

This invention relates to cooking stoves of the kind having hinged covers for the tops thereof. It has for its principal objects to provide a folding cover for the entire stove top that is simple, compact and easily operated, that is not likely to get out of repair and that will provide a splasher back when opened and a guard or back plate when closed. Another object is to provide a removable work board for the stove top. The invention consists in the cooking stove and in the construction, combination and arrangements of parts hereinafter described and claimed.

In the accompanying drawings, which form part of this specification and wherein like symbols refer to like parts wherever they occur, Fig. 1 is a front elevation of a cooking stove embodying my invention, showing the cover closed, Fig. 2 is a plan view of said stove with the cover closed, Fig. 3 is a fragmentary front elevation of said stove, showing the cover opened, Fig 4 is a fragmentary vertical section through the rear upper corner of said stove on the line 4—4 in Fig. 2, Fig. 5 is a plan view of the stove, showing the folding cover opened, parts of the work board and the bottom plate of the recess therefor being shown broken away, Fig. 6 is a rear elevation of the upper portion of the stove with the cover closed, Fig. 7 is an end elevation of the rear upper corner portion of the stove, with the cover being shown closed, Fig. 8 is a view similar to Fig. 7 with the cover shown opened, Fig. 9 is a view similar to views 7 and 8, showing the cover partially opened; and Figs. 10 and 11 are fragmentary sections on the lines 10—10 and 11—11, respectively, in Fig. 6.

My stove comprises a cabinet A provided with a top cooking section B, a top non-cooking or work-table section C and an oven D located beneath said last mentioned section and closed by a door E. The top cooking section B comprises suitable utensil supporting grids 1 with suitable heating members or burners 2 therebelow that are supplied with gas controlled in the usual manner by the usual valves 2a at the front of the stove. The non-cooking or work section C of the stove top comprises a work or slicing board or plate 3 of nonmetallic heat resisting material, such as cement and asbestos, that is removably seated in an opening 4 provided therefor in said stove top. Located below this opening is a layer of suitable insulation 5 for the oven D; and interposed between said insulation and the work board 3 is a metallic plate 6 that closes the bottom of said opening. The opening 4 is provided near its bottom with a ledge 7 that supports the plate 6 above and clear of the oven insulation 5 to provide a heat insulating air space between the latter and said plate. The plate 6 is secured to the ledge 7 by means of screws 8; and the work board 3 is supported on the heads of said screws above and clear of said plate, thereby forming a heat insulating air space between said plate and said work board. A notch is formed along one edge of the opening 4 to facilitate removal of the work board 3 therefrom.

The top of the stove is provided with a folding cover for the entire top thereof adapted to cover the cooking and work sections thereof. Said folding cover comprises a main front half-section 9 and a rear half-section 10 that are secured together along their adjacent edges by suitable hinges 11 and extend substantially from end to end of the stove top. The rear section is secured at its rear edge by suitable hinges 12 to a portion of the stove top that is located rearwardly of the cooking and work top sections and overhangs the back wall of the stove. Handles 13 for folding and unfolding the cover are fixed to the ends of the front section 9 thereof; and suitable springs 14 are provided for assisting the opening movement of the cover. Each of said springs is located back of the stove with its lower end fastened to a suitable bracket 15 thereon and with its upper end hooked into the rearwardly extending arm of a bracket 16 fixed to the rear edge of the rear cover section 10. By this arrangement, when it is desired to raise the cover, the handles 13 of the front section 9 thereof are used to raise the adjacent edges of the two cover sections; whereupon the springs 14 assist in swinging the rear section rearwardly on the hinge 12 until the two sections reach a folded vertical position at the rear edge of the stove top. In this open or folded position of the cover, the lower edge of the rear section thereof abuts against suitable stops 17 that are secured to the rear marginal portion of the stove top and prevent further rearward swinging movement of the folded sections. In the open position of the cover, the folded upright sections thereof form a splasher back for the entire length of the stove top. In the closed position of the cover, it forms a smooth table top for the entire stove.

Mounted on the rear section 10 of the folding cover is a back plate member or guard 18 that extends from end to end of said section adjacent to the rear edge thereof and is secured along the front lower corners thereto by suitable hinges 19. This back plate or guard has a link connection with the overhanging portion of the stove top rearwardly of the hinges 12 that secure the folding cover thereto. This link has one end pivotally connected, as at 20, to the back of the guard plate 18 adjacent to the hinged lower edge thereof and its opposite end is provided with an elongated slot 21 adapted to receive a pin 22a formed on the free-end of a bracket 22 that is fixed to and projects rearwardly from the overhanging rear edge of the stove top. This link connection between the guard plate 18 and the stove top operates to swing said plate into an upright position when the cover is unfolded or closed and to swing said plate upwardly against the back face of the rear cover section when said cover is folded or opened. In the unfolded position of the cover, the back guard 18, one end of the slot 21 in the link 20 bears against the pin 22a and thus prevents forward tilting of said guard, rearward tilting of said guard being prevented by the hinge 19. In the folded position of the cover, the pin engages the opposite end of said slot and serves to hold said guard against the vertically disposed rear section of said cover.

The hereinbefore described construction has several advantages. It provides a work or cutting board that is insulated from the heat of the oven and can be quickly and easily removed for cleaning. The cover, when closed, covers the cooking section and the cutting board and provides a rigid upstanding guard along the rear edge of said cover. In the raised or folded position of the cover, it forms a splasher back of neat and attractive appearance that extends substantially the entire length of the stove top with the guard plate hidden from view and compactly folded against the back face of the rear cover section.

What I claim is:

1. A cooking stove having a top comprising a burner section and a work table section, and a single folding cover for said sections, said cover being adapted to serve as a splasher back in the folded position thereof, said cover including a hinged plate adapted to serve as a guard for the rear edge of said cover in the unfolded position thereof and to fold substantially flatwise against said cover in the folded position thereof.

2. A cooking stove having a top comprising a burner section and a work table section, and a single folding cover for said sections, said cover being adapted to serve as a splasher back in the folded position thereof, said cover including a plate adapted to serve as a guard member for the rear edge of said cover in the unfolded position thereof and to fold against the back of said cover in the folded position thereof, and a spring connection between said stove and said cover for assisting the folding movement thereof.

3. A cooking stove having a cooking top, a hinged cover for said cooking top, said cover being adapted to serve as a splasher back in the open position thereof, and a plate hingedly secured to said cover and adapted in the closed position thereof to project upwardly from said cover along the rear edge thereof and to automatically fold against the back of said cover when the latter is closed.

4. A cooking stove having a top comprising a burner section and a work table section, and a single folding cover for said sections, said cover adapted to serve as a splasher back in the folded position thereof, said cover comprising half sections that extend longitudinally of the stove top substantially from end to end thereof and are hingedly connected together along their adjacent edges, a plate extending along and secured to the rear edge of the rear cover section and adapted in the unfolded position thereof to serve as a rear guard plate for said cover, and a spring connection between said stove and said rear cover section for assisting the folding movement of said cover.

5. A cooking stove having a top and a folding cover therefor, said cover extending substantially from end to end of the stove and comprising front and rear sections hinged together along their adjacent edges, means for hingedly securing the rear edge of said rear section to the stove top, whereby said cover is adapted to be folded into an upright position at the rear portion thereof, a spring connection between said cover and said stove for assisting the folding movement of said cover, a plate member hinged to the top of said rear cover section adjacent to the rear edge thereof, and a connection between said plate and said stove for swinging said plate into an upright position on said rear cover section in the unfolded position of the cover and for folding said plate against the back of said rear cover section in the folded position of said cover.

6. A cooking stove having a top and a folding cover therefor, said top extending substantially from end to end of the stove and comprising front and rear sections hinged together along their adjacent edges, means for hingedly securing the rear edge of said rear section to the stove top, whereby said cover is adapted to be folded into an upright position at the rear edge of said top, a spring connection between said rear cover and said stove for assisting the folding movement of said cover, a plate member hinged to the top of said rear cover section adjacent to the rear edge thereof, a connection between said plate and said stove for swinging said plate into an upright position on said rear cover section in the unfolded position of the cover and for folding said plate against the back of said rear cover section in the folded position of said cover, said connection comprising a pin on said stove and a link pivotally connected at one end to said plate and provided adjacent to its other end with an elongated slot adapted to cooperate with said pin.

MAURICE G. KLEMME.